(12) United States Patent
Lassen et al.

(10) Patent No.: US 6,598,875 B2
(45) Date of Patent: Jul. 29, 2003

(54) ORIGINAL-AFFIXING DEVICE

(75) Inventors: Bernd Lassen, Mönkeberg (DE); Klaus Kossmann, Raisdorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 209 days.

(21) Appl. No.: 09/878,664

(22) Filed: Jun. 11, 2001

(65) Prior Publication Data

US 2002/0008353 A1 Jan. 24, 2002

Related U.S. Application Data (63) Continuation of application No. PCT/DE99/03893, filed on Dec. 6, 1999.

(30) Foreign Application Priority Data

Dec. 10, 1998 (DE) .......................................... 198 56 895

(51) Int. Cl.[7] .................................................. B65H 1/26
(52) U.S. Cl. ...................................... 271/277; 400/691
(58) Field of Search ................................ 271/157, 164, 271/277, 82, 134; 400/691, 692, 693; B65H 1/26, 1/22

(56) References Cited

U.S. PATENT DOCUMENTS

| | | | | |
|---|---|---|---|---|
| 4,972,227 A | * | 11/1990 | Onoda et al. | 399/116 |
| 5,324,023 A | | 6/1994 | Fedorjaka | |
| 5,329,301 A | | 7/1994 | Balzeit et al. | |
| 5,619,246 A | * | 4/1997 | Straayer et al. | 347/262 |

FOREIGN PATENT DOCUMENTS

| | | | | |
|---|---|---|---|---|
| DE | 39 38 480 A1 | | 5/1991 | |
| EP | 0 521 311 A1 | | 1/1993 | |
| WO | WO 91/03120 | | 3/1991 | |
| WO | WO 91/07842 | * | 5/1991 | H04N/1/08 |

* cited by examiner

*Primary Examiner*—Donald P. Walsh
*Assistant Examiner*—Kenneth W Bower
(74) *Attorney, Agent, or Firm*—Laurence A. Greenberg; Werner H. Stemer; Ralph E. Locher (57) ABSTRACT

A device for affixing an original onto a scanning cylinder includes a housing for accommodating components of the device, the housing having a front, a rear and a lateral region, and being provided, in the front region, with an original table whereon an original is clampable, and in the lateral region, with two arms articulatedly connected therein and being slidable on guides for moving the table to the cylinder, the housing, in the rear region, being provided with a trough open at the top for accommodating the cylinder, and being constructed to accommodate, respectively, one of two cylinders of different diameter; and a roller for pressing the original onto the cylinder during a clamping process of the original, the roller extending parallel to the cylinder and being fixed to two curved swinging arms articulatedly connected to the rear region and matching the shape of the housing.

14 Claims, 7 Drawing Sheets

ORIGINAL-AFFIXING DEVICE

CROSS-REFERENCE TO RELATED APPLICATION

This application is a continuation of copending International Application No. PCT/DE99/03893, filed Dec. 6, 1999, which designated the United States.

BACKGROUND OF THE INVENTION

FIELD OF THE INVENTION

The invention relates to an original-affixing device for affixing printing originals onto scanning cylinders for drum scanners.

Drum scanners have a scanning cylinder whereon the originals to be scanned are clamped before being scanned. Because this clamping operation on the drum scanner itself is awkward and time-consuming, these scanners are constructed so that the scanning cylinder is removable, which offers the advantage that complementing the cylinders with the originals can be performed outside the scanner, and that, depending upon the size of the originals or the type of originals, different scanning cylinders with different diameters and lengths can be used. These cylinders are complemented with the desired originals in the make-ready work before scanning takes place.

Conventionally, the originals to be scanned are mounted on the scanning cylinder manually with the aid of adhesive strips. According to the prior art, devices for simplifying and facilitating this operation have also become known heretofore. The European Published and Prosecuted Patent Application (EP-A) 0 521 311 describes a flexible frame comprising a lower and an upper plastic film, between which the original to be scanned is laid. The thickness of the plastic films is selected so as to avoid the occurrence of Newton rings, which otherwise would be disruptive during the scanning of the original. Further devices for clamping and holding sheet material on rotating drums have become known heretofore. In U.S. Pat. No. 5,324,023, a clamping device is described which holds sheet material on a drum, the holding force being further reinforced by centrifugal force during rapid rotation of the drum. The published International PCT Patent Application WO 91/03120 describes a device for automatically clamping and unclamping film material on a recording drum, having a guide surface, a pressure roller, a lifting device and a drive for transporting the film material. The film material is held on the drum by vacuum suction holes. U.S. Pat. No. 5,329,301 describes a clamping and holding device for film material on a recording drum, wherein a number of rows of vacuum suction holes are provided on the drum surface. When the material is being clamped on the cylinder, the rows of suction holes are connected in succession to a vacuum pump the instant that they are covered by the material. Film material having different formats is thereby clamped on smoothly and without creases, even if the printing material wraps only partly around the drum.

Devices for affixing originals to be scanned on a removable scanning cylinder have likewise become known heretofore, for example the original-affixing device "ChromaMount P 320" from the firm Rudolf Hell GmbH, Siemenswall, D-24107 Kiel, Germany, order number 04071654. This device serves for affixing originals or mounting films at a correct angle on scanning cylinders. In this appliance, the scanning cylinder lies in a holder which is countersunk in a trough provided in a work table. An illumination arm serves for internally illuminating the cylinder in order to detect contamination or Newton's rings on the cylinder or on the original. The illumination arm can be displaced axially into a left-hand end position outside the cylinder in order to change the cylinders, and in this way releases the cylinder. Provided in the trough of the work table is a roller block for accommodating the cylinders, the roller block being adjustable manually to the various cylinder sizes. The cylinders are interchanged by simply clicking the roller shaft out or in, respectively, on the roller block. Also provided is an original platform for accommodating the original before it is affixed or mounted, it being possible for the platform to be set against the cylinder surface by an adjusting wheel, the adjustment being required to be matched to the different cylinder diameters. In order to clamp the originals on, a freewheeling brake for braking the cylinder rotation is provided and serves for fixing the cylinder, that is, when the brake is set, the scanning cylinder is rotatable during the clamping operation only in one direction, i.e., in the direction of rotation of the clamping operation, but not, however, in the opposite direction. The purpose thereof is that, during the clamping of the original, the latter can be subjected to tension during the rotation of the cylinder, so that the original rests smoothly on the cylinder. It is therefore possible for the original to be held taut manually, counter to the direction of rotation of the cylinder, during the clamping operation. Also provided is a pivotable pressure roller, by which the original is pressed against the cylinder during the clamping operation. The pressure roller is interchangeable for the different cylinders, respectively. In order to remove the cylinder, the pressure roller, which is fixed to a swinging arm, can be folded upwardly.

Because speed or rapidity, i.e., simple operation of such devices, is of considerable importance during the make-ready work, manual adjustments, in particular, of the roller block here, setting of the original platform to the respective cylinder diameter, engaging the freewheeling brake, and interchanging and adjusting the pressure roller are hindrances.

SUMMARY OF THE INVENTION

It is accordingly an object of the invention to provide an original-affixing device which is of relatively simple operation and, consequently, has an optimum operating speed.

With the foregoing and other objects in view, there is provided, in accordance with the invention, an original-affixing device for affixing an original onto a scanning cylinder for a drum scanner, comprising a typewriter-like housing for accommodating and securing individual components of the device, the housing having a front, a rear and a lateral region, the housing, in the front region thereof, being provided with a movable original table whereon an original is clampable, and in the lateral region thereof, provided with two arms articulatedly connected therein and being slidable on guides for bringing the table to the scanning cylinder, the housing, in the rear region thereof, being provided with a trough extending in a longitudinal direction, the trough being open at the top for accommodating the scanning cylinder, the trough being of such construction as to be able to accommodate, respectively, one of two cylinders of different diameter, and further comprising a pressure roller extending parallel to the scanning cylinder and serving for pressing the original onto the scanning cylinder during a clamping process of the original, the pressure roller being fixed to two curved swinging arms articulatedly connected to the rear region of the housing and matching the shape of the housing.

In accordance with another feature of the invention, the arms, at lower ends thereof, by which they are guidable in the housing, are provided with two guide pins spaced a distance from one another and guidable, respectively, in coulisses.

In accordance with a further feature of the invention, the coulisses are arranged within the housing so that the original table is liftable and simultaneously displaceable in a direction to the scanning cylinder by an engagement of the pins in the coulisses, the coulisses having a course beginning in a lower part of the housing, extending obliquely upwardly in a direction to the cylinder and, via a dead center, falling again in a direction to the lower part of the housing.

In accordance with an added feature of the invention, the arms at the sides of the original table have two handles.

In accordance with an additional feature of the invention, the arms have two handles at the sides of the original table, and the original table is displaceable within the coulisses manually via the handles, the original table being liftable and being pullable forwardly so as to assume a latched position wherein the scanning cylinder is respectively insertable into and removable from the trough, and, alternatively, the original table, due to being lifted and being pushed rearwardly, and overcoming the dead center of the coulisses and being lowered in the direction to the lower part of the housing, assuming a position within the coulisses wherein the original table rests on the respective scanning cylinder.

In accordance with yet another feature of the invention, the two cylinders are a cylinder of smaller diameter and a cylinder of larger diameter, the device including, within and at the ends of the trough, two roller pairs for the cylinder of smaller diameter, and two roller pairs for the cylinder of larger diameter, the respective cylinders resting on the roller pairs, respectively.

In accordance with yet a further feature of the invention, the larger-diameter cylinder is shorter than the smaller-diameter cylinder.

In accordance with yet an added feature of the invention, the roller pairs for the cylinder of larger diameter are arranged at the ends of the trough underneath the roller pairs for the cylinder of smaller diameter, mounting supports for the roller pairs for the cylinder of larger diameter at the two opposite ends of the trough being spaced a smaller distance from one another, corresponding to the length of the larger cylinder.

In accordance with yet an additional feature of the invention, the larger-diameter cylinder has a length which corresponds to the length of the smaller-diameter cylinder.

In accordance with an alternative feature of the invention, the larger-diameter cylinder has a length which is greater than the length of the smaller-diameter cylinder.

In accordance with still another feature of the invention, the larger-diameter cylinder has a length at least equal to the length of the smaller-diameter cylinder, and an annular recess is formed at that end of the trough at which the open end of the larger-diameter cylinder is located, the open end of the larger-diameter cylinder being able to be pushed into the annular recess, the annular recess being of such width that the open end of the larger-diameter cylinder is movable freely within the annular recess.

In accordance with still a further feature of the invention, the original-affixing device includes, at the rear side of the housing, two curved swinging arms matching the curvature of the housing, an exchangeable pressure roller fixed to upper ends of the swinging arms, the pressure roller being alternatively lowerable onto the surface of the cylinder and pivotable rearwardly out of the region of the trough, respectively, by the swinging arms.

In accordance with still an added feature of the invention, the pressure roller has a mounting support constructed so that the pressure roller is freewheelingly rotatable in a direction wherein the cylinder is rotated during clamping, and is blocked in the direction of rotation opposite thereto.

In accordance with a concomitant feature of the invention, the original-affixing device includes an illuminated magnifier fixed above the scanning cylinder on the rear side of the housing, so that the region of the scanning cylinder wherein the original is to be affixed is thereby displayable in magnified form.

Other features which are considered as characteristic for the invention are set forth in the appended claims.

Although the invention is illustrated and described herein as embodied in an original-affixing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
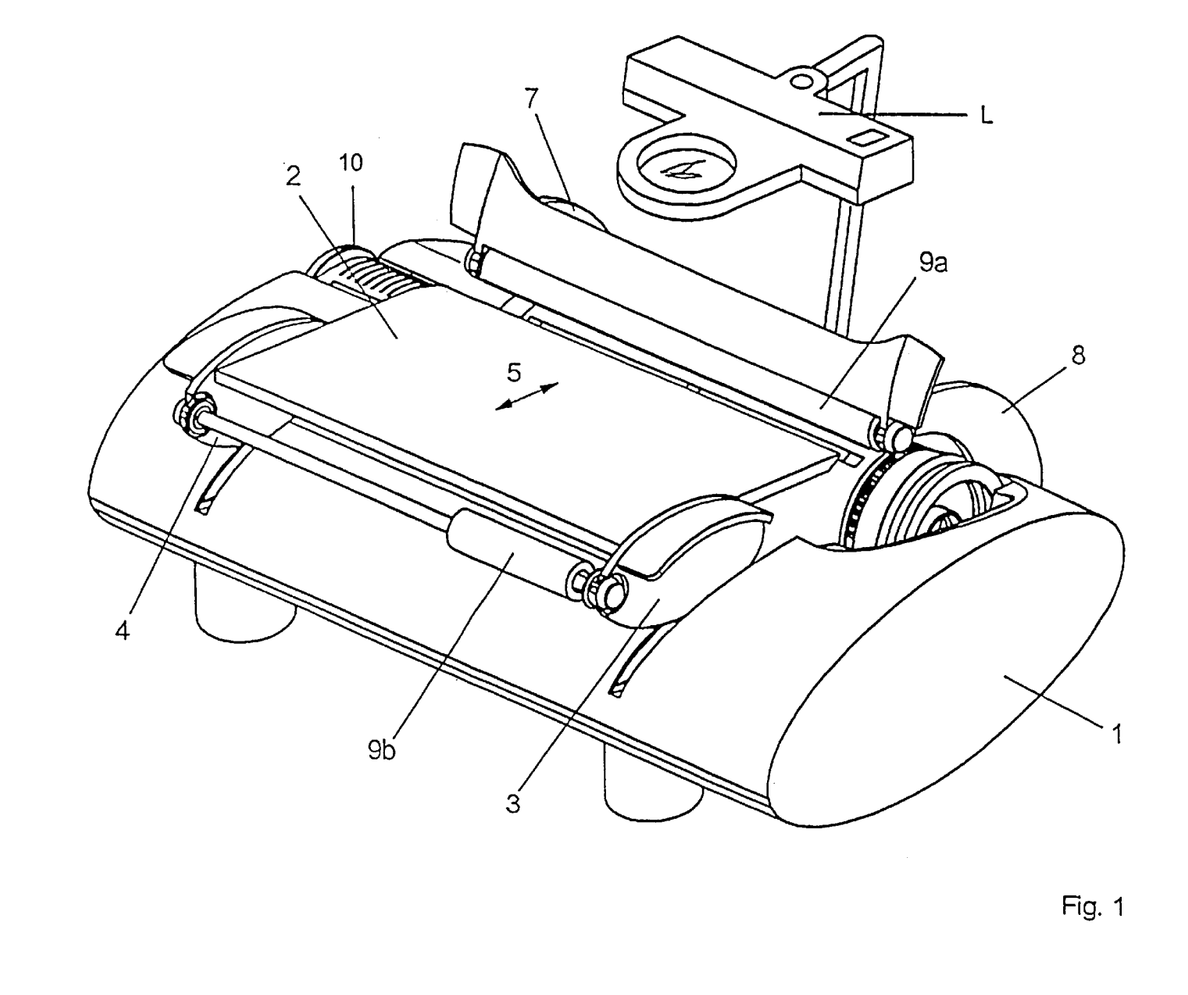
FIG. 1 is a perspective, partly broken-away, front, side and top view of the device according to the invention.

Referring now to the drawings and, first, particularly to FIG. 1 thereof, there is shown therein, in a perspective view, an original-affixing device according to the invention. The device has a typewriter-like housing 1, into which the individual device components are built. Provided in the upper front region is an original table 2, which is fixed to two arms 3 and 4 and, by these arms, can be lifted upwardly and displaced horizontally forwardly and rearwardly, respectively, in the directions of the double-headed arrow 5. In addition, the housing 1 includes, in an upper rear region thereof, a trough 6 extending in the longitudinal direction of the housing for accommodating cylinders. The device is preferably constructed so that this trough can alternatively accommodate two different cylinders of different diameter, namely a cylinder with a smaller and a cylinder with a larger diameter. This offers the advantage that the operator does not have to adjust anything on the device in order to insert the different cylinders.

Provided on the rear side of the housing are two curved swinging arms 7 and 8 having a curvature matching the shape of the housing, the swinging arms 7 and 8 having, at upper ends thereof, an interchangeable pressure roller 9a fixed thereto. This pressure roller extends over the entire width of the original table and is used when wide originals are to be clamped thereon. The roller is constructed so that, in the direction of rotation of the clamping process, it has an effective freewheel which is blocked in the opposite direction of rotation. It is therefore unnecessary for any brake to be adjusted manually on or off, which is likewise associated with a further operating advantage in relation to simplification and time-saving.

It is often necessary, however, that smaller originals, such as transparencies, which do not occupy the entire width of the original table 2, to be clamped on the original table. Provided in this regard is a second interchangeable pressure roller 9b, which, at the front end of the original table, is detachably fixed to the arms 3 and 4. This roller 9b can be interchanged with the roller 9a. By the pivoting movement of the two arms 7 and 8 in a direction towards the cylinder 11 (note FIG. 3, for example), the pressure roller can be lowered onto the cylinder surface or is pivotable rearwardly entirely out of the upper region of the trough, as shown in FIG. 2, for example.

In the event that additional illumination from above is needed during the mounting or affixing operation, an illuminated magnifier L can be affixed to the rear side of the appliance, as shown in FIG. 1.

Figure 2:
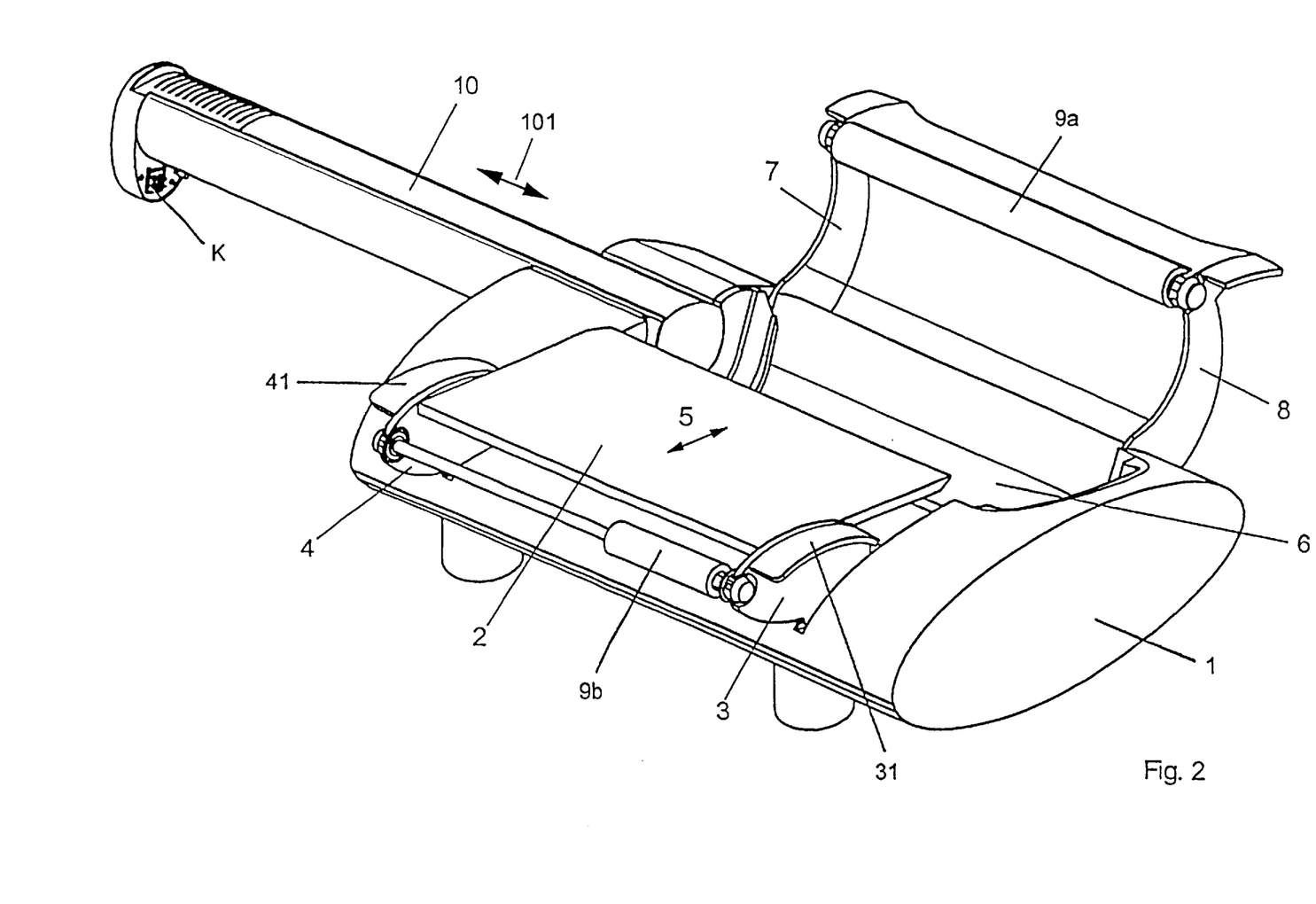
FIG. 2 is a view similar to that of FIG. 1, showing the original-affixing device with a swinging arm for a pressure roller thereof folded upwardly, and an illumination arm thereof pulled out laterally from the main body of the device.
Figure 3:
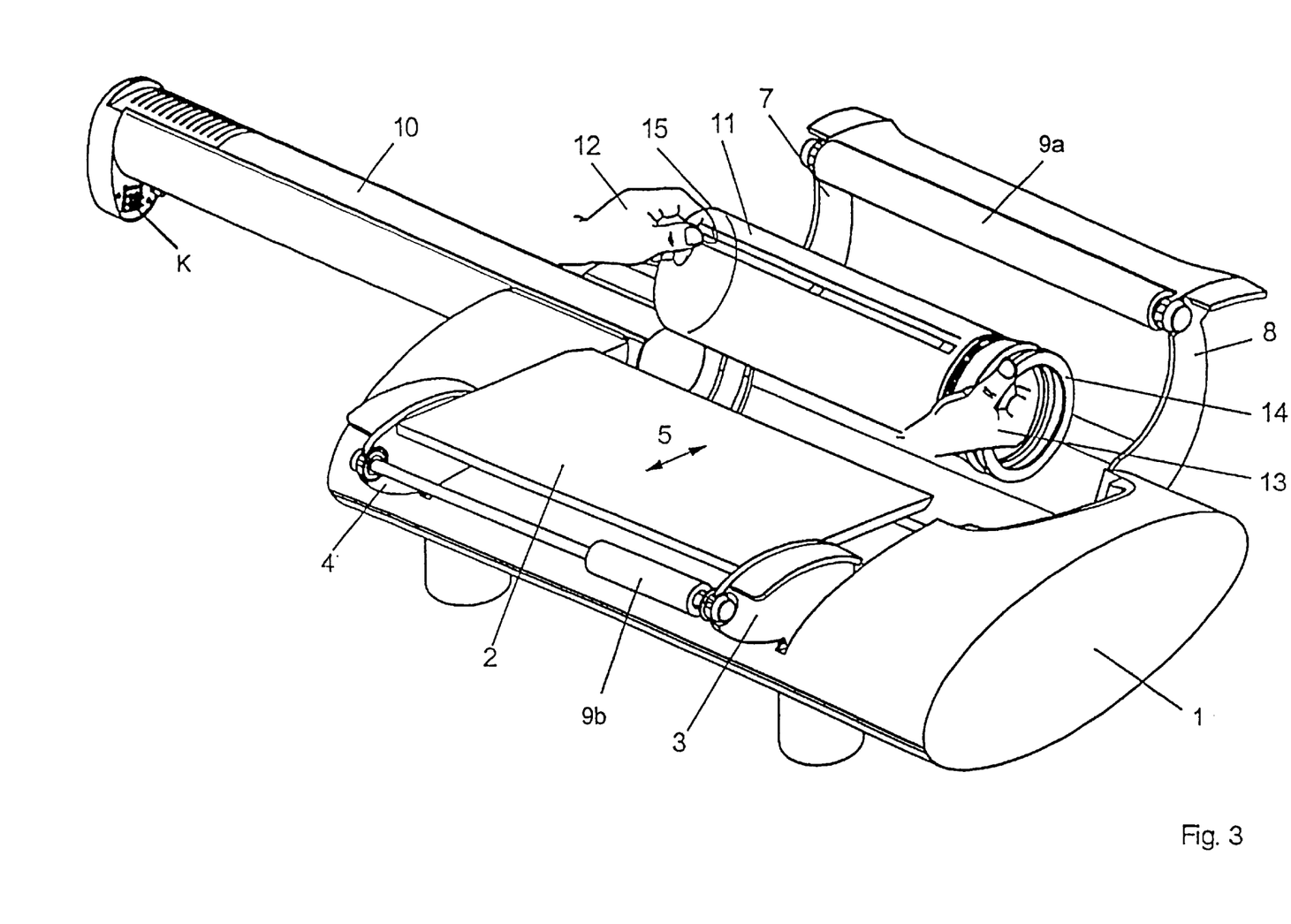
FIG. 3 is a view like that of FIG. 2, showing how a cylinder is inserted into the device.

Additionally provided is an internal illumination system for the cylinder 11, the illumination system being constructed as an illumination arm 10, which is displaceably disposed at the left-hand side of the trough 6, as viewed in FIGS. 2 and 3. The illumination arm 10 can be pushed into the interior of the respective cylinder 11 through an open end 15 of the cylinder 11. During normal operation of the device, the illumination arm 10 is located within the cylinder 11. For the purpose of removing and loading the cylinder 11, the illumination arm 10 is pushed towards the left-hand side of FIGS. 2 and 3, for example, and out of the cylinder 11.

FIG. 2 shows the device in the loading position. The trough 6 is illustrated in the empty state thereof. By pivoting the arms 7 and 8 backwards, the pressure roller 9a is similarly pivoted rearwardly and, therefore, exposes the trough 6 in the rear region. By the fact that the original table 2 is pivoted forwardly in horizontal direction 5, the front part of the trough 6 is exposed. The illumination arm 10 has been pushed completely to the left-hand side. The mechanical sequence of the pivoting movement of the original table 2 is explained hereinafter in greater detail in the description of FIGS. 4, 4a, 5 and 5a. The trough 6 has now been prepared to accommodate the cylinder. The insertion of the cylinder can be performed, and is shown in FIG. 3.

In FIG. 3, the cylinder 11 is being inserted into the trough 6 by the hands 12 and 13 of the pressman or other operator. A flanged end 14 of the cylinder 11 is directed towards the right-hand side, and an open end 15 of the cylinder 11 is directed towards the left-hand side. Provided at the ends of the trough 6 are holding devices for the respective cylinders, these holding devices being illustrated in greater detail in the sectional views of FIGS. 4a and 4b. After the cylinder 11 has been inserted, the illumination arm 10 is pushed into the cylinder 11. In this regard, contacts K, which are disposed on the illumination arm 10, meet non-illustrated contacts provided on the housing 1, in order, in this way, to switch on the power supply for the illumination. This is, moreover, a simplification of the actual operation, because the operator does not have to concern himself or herself with switching on the illumination.

Figure 4:
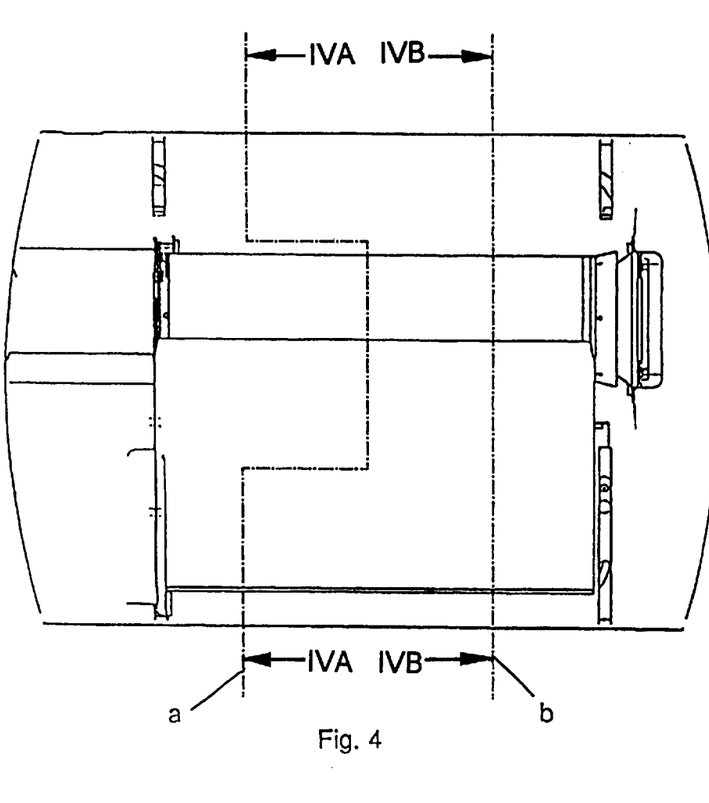
FIG. 4 is a top plan view of the original-affixing device according to the invention.
Figure 4A:
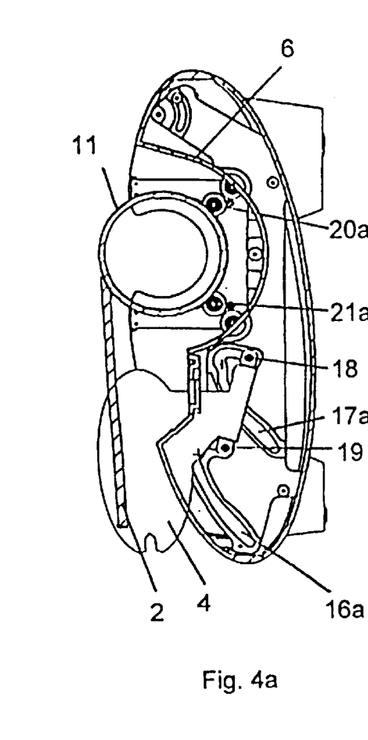
FIGS. 4a and 4b are sectional views of FIG. 4 taken along the lines IV A and IV B, respectively, through the device in the vicinity of the mounting supports for the cylinder and for a mechanism for moving the original table for an inserted cylinder of smaller diameter.
Figure 4B:
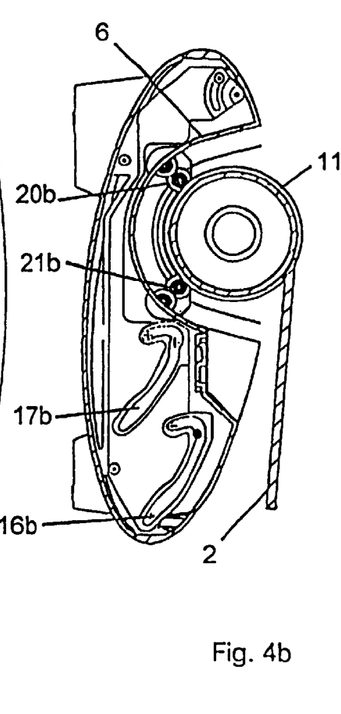

FIG. 4 is a top plan view of the device according to the invention, and FIGS. 4a and 4b are sectional views of FIG. 4 taken along the lines IVA and IVB, respectively, in the directions of the respective arrows, the appliance being shown with the smaller-diameter cylinder inserted therein. Provided in FIG. 4a are two slotted guides or coulisses 16a and 17a, wherein the arm 4 is guided. Guidance is provided by pins 18 and 19, which are fixed to the lower end of the arm 4. The lower end of the arm 4 is constructed as a lug-like extension, the pins 18 and 19 being disposed at the ends of the extension at the same distance as are the slotted guides 16a and 17a. As a mirror image in relation to FIG. 4a, the two slotted guides 16b and 17b shown in FIG. 4b are provided for guiding the arm 3 in a manner similar to that for guiding the arm 4. FIG. 4a shows the arm 4 in a latched position within the slotted guides 16a and 17a, thereby causing the original table 2 to rest on the cylinder 11. The arm 3 has been omitted from FIG. 4b, because the sectional view of FIG. 4b is taken along the line b in FIG. 4. The original table 2 is operated so that, for example in FIG. 2, the table is lifted, by handles 41 and 31, perpendicularly to the directions of the double-headed arrow 5 and is displaced in accordance with the arrow 5 in a direction towards the cylinder 11. The movement of the table, which is fixed to the arms 3 and 4, is determined by the slotted guides 16a, 17a and 16b, 17b. It is apparent from FIG. 4a that, in the latching position shown, the original table 2 rests on the cylinder 11, which corresponds to the end position of the rearward movement in the direction of the arrow 5. This position of the table 2 applies to the situation wherein a smaller-diameter cylinder has been inserted into the trough.

If one wishes to remove the cylinder, the original table 2 is then lifted perpendicularly to the direction of the arrow 5 and pulled forward by the handles 41 and 31. The table 2, guided by the slotted guides or coulisses 16a, 17a and 16b, 17b, then reaches the other end position within the slotted guides or coulisses, which is not illustrated in FIG. 4a. The slotted guides or coulisses are constructed so that, in the first latched position shown, the table rests on the cylinder and, in the second latched position, assumes the end position thereof for unloading or loading.

Figure 5:
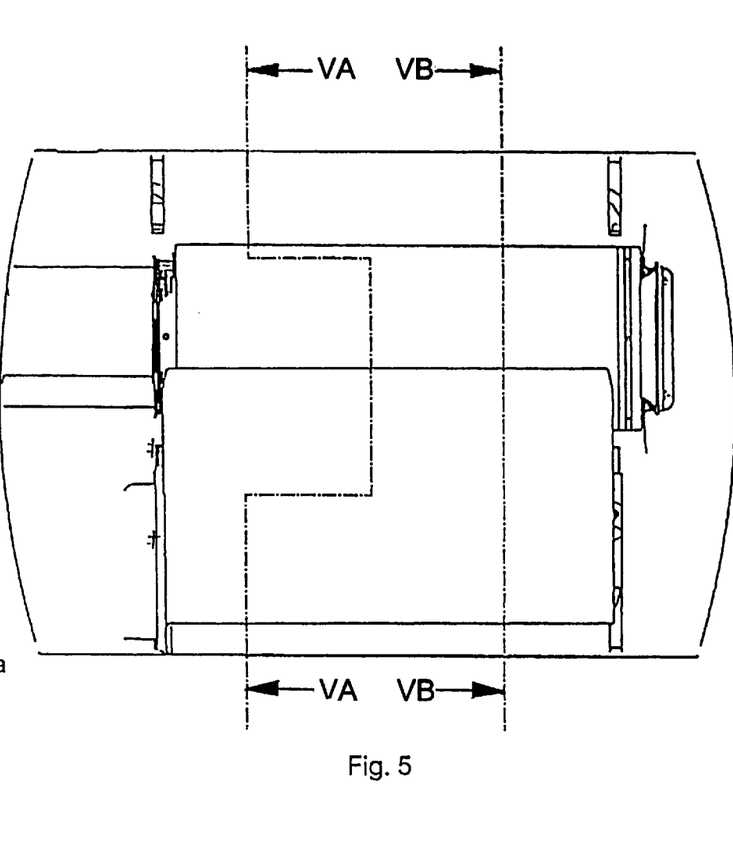
FIG. 5 is a top plan view of the device like that of FIG. 4, but with an inserted cylinder of larger diameter.
Figure 5A:
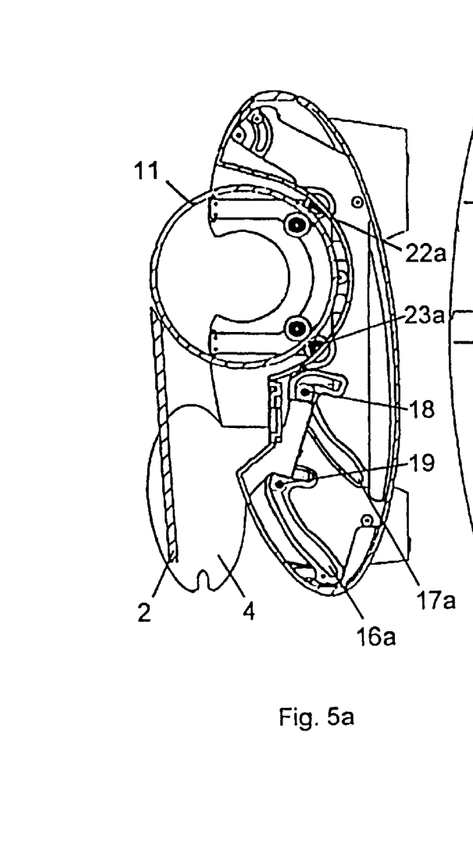
FIGS. 5a and 5b are sectional views of FIG. 5 taken along the lines V A and V B, respectively, through the device in the vicinity of the mounting supports for the cylinder and of a mechanism for moving the original table, for the inserted cylinder of larger diameter.
Figure 5B:
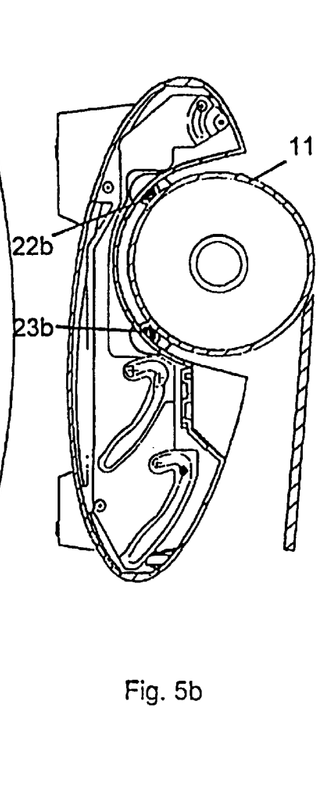

FIG. 5 again is a top plan view of the appliance according to the invention. FIGS. 5a and 5b, as FIGS. 4a and 4b, are sectional views taken along respective section lines a and b, in the directions of the arrows VA and VB with a larger-diameter cylinder inserted in the device according to the invention. The two slotted guides or coulisses 16a and 17a, wherein the arm 4 is guided, are again shown in FIG. 5a. Guidance is again provided by pins 18 and 19, which are fixed to the lower end of the arm 4. FIG. 5a shows the arm 4 in a different position within the slotted guides or coulisses 16a and 17a than that shown in FIG. 4a, which again causes the original table 2 to rest on the cylinder 11. The operation of the original table 2 has been performed so that, for example in FIG. 2, by the handles 41 and 31, the table 2 is lifted perpendicularly to the direction of the arrow 5 and displaced in accordance with the arrow 5 in the direction towards the cylinder 11. The movement of the table 2, which is fixed to the arms 3 and 4, is determined by the slotted guides or coulisses 16a, 17a and 16b, 17b. FIG. 5a similarly shows that, in the illustrated position, the original table 2 likewise rests on the cylinder 11, which here corresponds to the end position of the rearward movement in the direction represented by the arrow 5. As is apparent, the operator merely has to lift and displace the original table by the handles 31 and 41, the position of the table being automatically adapted to the relevant cylinder size. It is no longer necessary for the position of the original table to be matched manually to the size of the inserted cylinder, because the device itself determines the correct position. This is a great advantage when compared with conventional original-affixing devices, because the operator no longer has to concern himself or herself with the adjustment of the roller block during the insertion of the cylinders, which is consequently associated with considerable savings in time, overall.

If one wishes to remove the cylinder, the original table 2 is then lifted perpendicularly to the direction represented by the arrow 5 and pulled forward by the handles 41 and 31. The table 2, guided by the respective slotted guides or coulisses 16a, 17a and 16b, 17b, then reaches the other end position within the slotted guides or coulisses, which is not shown in FIG. 5a. The slotted guides or coulisses are constructed so that, in the illustrated first latched position, the table 2 rests on the cylinder 11 and, in the second latched position, the table 2 again assumes the end position thereof for unloading or loading.

Figure 4C:
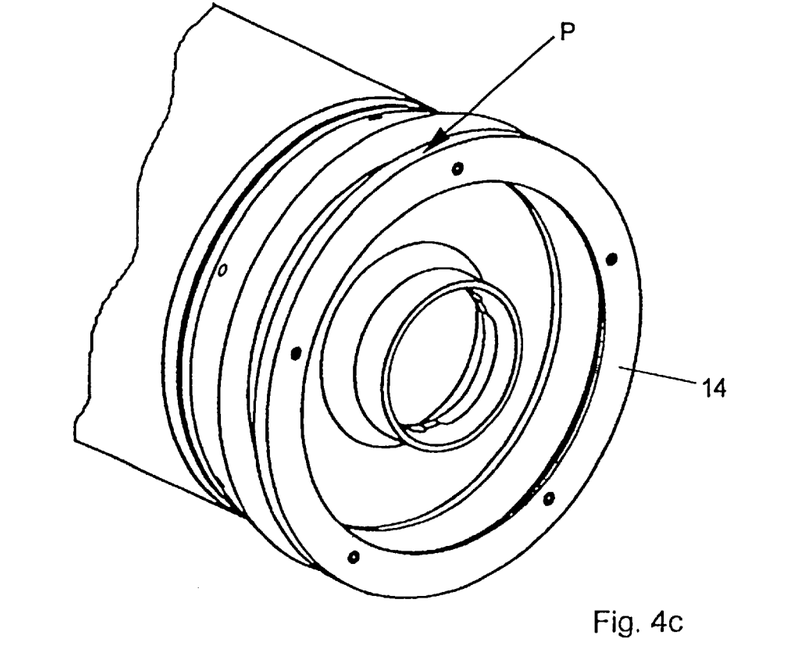
FIG. 4c is a fragmentary perspective view of the cylinder with a smaller diameter showing the end flange thereof.
Figure 5C:
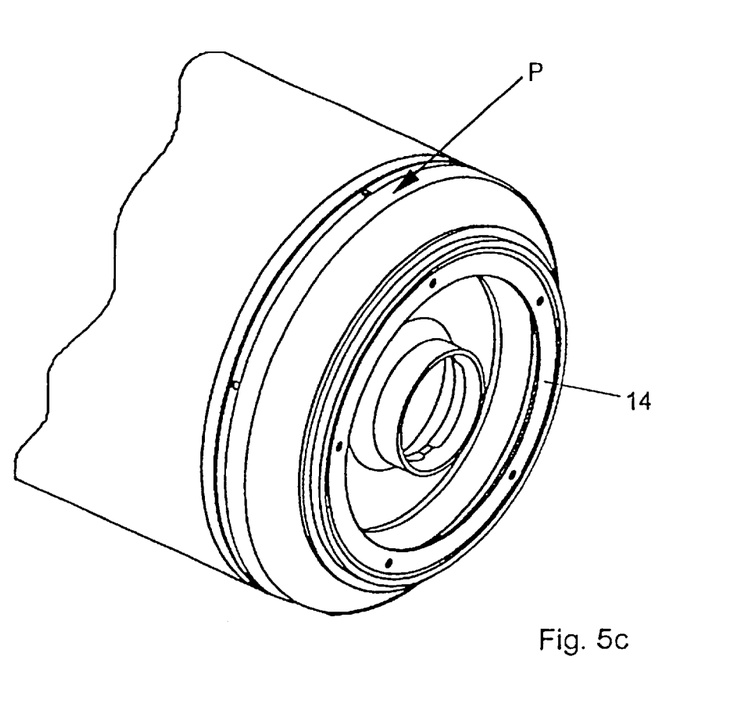
FIG. 5c is a fragmentary perspective view of the cylinder with the larger diameter showing the end flange thereof.

FIGS. 4, 4a, 4b and FIGS. 5, 5a, 5b show, in the upper regions thereof, holders for the two different cylinder sizes which are used. The smaller cylinder is shown in FIG. 4c, and the larger cylinder in FIG. 5c. In FIGS. 4c and 5c, the surfaces whereon the cylinders rest at the respective flanged end 14 thereof are identified by an arrow P.

FIG. 4a shows how the smaller-diameter cylinder of FIG. 4c is mounted at the left-hand end of the trough 6. The cylinder rests with the open end thereof on two rollers 20a and 21a, which are fixed at the left-hand end of the trough 6. FIG. 4b shows how the cylinder 11 is mounted at the right-hand end of the trough 6, likewise on two rollers 20b and 21b. The bearing surface P of the cylinder 11, which rests on the rollers 20b and 21b in FIG. 4b, is appropriately identified in FIG. 4c.

FIG. 5a shows how the larger-diameter cylinder of FIG. 5c is mounted at the ends of the trough 6. The cylinder rests with the open end 14 thereof on two rollers 22a and 23b, which are fixed at the left-hand end of the trough 6. The cylinder likewise rests with the flanged end 14 thereof on two rollers 22b and 23b, which are fixed at the right-hand end of the trough 6. The bearing surface P of the cylinder 11, which rests on the rollers 22b and 23b in FIG. 4b, is appropriately identified in FIG. 5c.

The larger-diameter cylinder of FIG. 5c may be shorter than the smaller-diameter cylinder of 4c by somewhat more than twice the thickness or diameter of the rollers 20a and 21a and, 20b and 21b, respectively. It is therefore possible for the roller pairs 22a, 23a and 22b, 23b at the ends of the trough 6 to be positioned underneath the roller pairs 20a, 21a and 20b, 21b, the mountings or holders for the pairs of rollers 22a, 23a and 22b, 23b at the two opposite ends of the trough 6 being disposed at a shorter distance from one another, in correspondence with the length of the larger cylinder. Accordingly, when the shorter cylinder with the larger diameter is being inserted, it is guided past the roller pairs 20a, 21a and 20b, 21b and placed on the roller pairs 22a, 23a and 22b, 23b.

By an inventive modification of the end of the trough which accommodates the open end of the cylinder, it is also possible to attain a construction wherein cylinders of larger diameter and greater length than those described in the preceding text can be inserted. It would then be necessary to provide an annular recess for the larger diameter of the cylinder at this end of the trough 6, the larger-diameter cylinder being able to be pushed in from the top right-hand side, as viewed in FIG. 5a, until it rests on the roller pair 22a, 23a. The annular recess would then have to be of such width that the cylinder, at the open end thereof, can rotate freely within the end, i.e., the annular recess would have to be wider than the thickness of the material of the cylinder at the open end of the cylinder.

Figure 6:
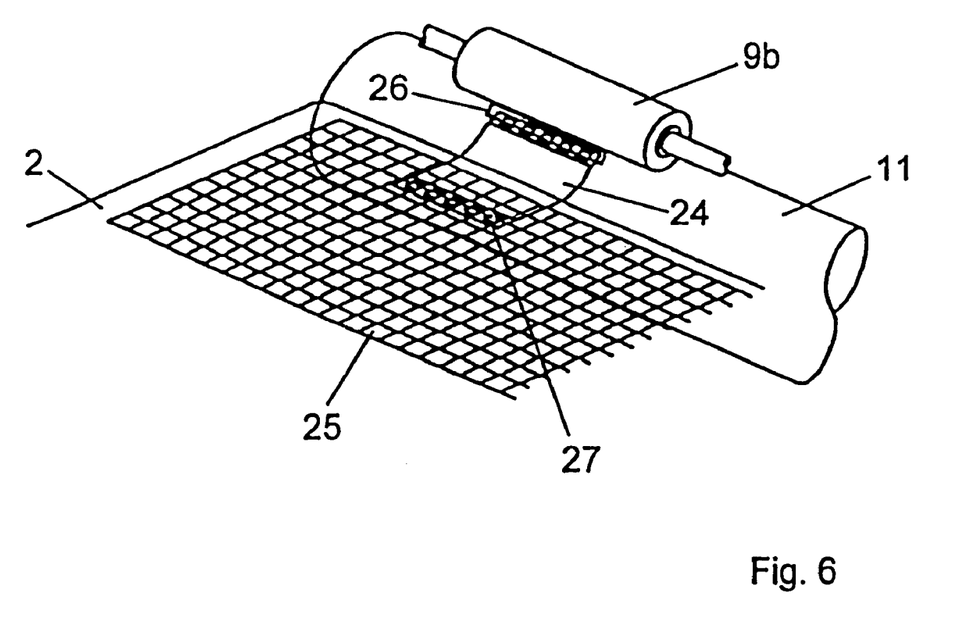
FIG. 6 is a fragmentary front, top and side perspective view of the original-affixing device showing how an original is affixed or mounted.

The clamping of an original is described hereinbelow, with reference to FIG. 6, using the clamping of a transparency by way of example. Once a cylinder has been inserted, the cylinder can be set into rotation by hand at the flanged end 14. FIG. 6 shows a cylinder 11 which has been led up to the original table 2 as described further hereinabove. A transparency 24 is to be clamped onto the cylinder 11. In this regard, it is advantageous if the original table has a network or screen of grid lines 25 thereon, by the aid of which the original can be positioned in relation to the cylinder. The network serves for fixing the relative position and the angle of the original in relation to the axis of the cylinder. Initially, the transparency is positioned on the network. It is then fixed to the cylinder surface by the upper end thereof by an adhesive strip 26. The pressure roller 9b is lowered and the cylinder is manually set into rotation, the transparency being tautened or subjected to tension with one hand at the free end, opposite to the direction of rotation. The rotation is continued until the transparency has been clamped on and, at the free end thereof, can be fixed to the surface of the cylinder by an adhesive strip 27.

We claim:

1. An original-affixing device for affixing an original onto a scanning cylinder for a drum scanner, comprising a typewriter-like housing for accommodating and securing individual components of the device, said housing having a front, a rear and a lateral region, said housing, in said front region thereof, being provided with a movable original table whereon an original is clampable, and in said lateral region thereof, with two arms articulatedly connected therein and being slidable on guides for bringing said table to the scanning cylinder, said housing, in said rear region thereof being provided with a trough extending in a longitudinal direction, said trough being open at the top for accommodating the scanning cylinder, said trough being of such construction as to be able to accommodate, respectively, one of two cylinders of different diameter, and further comprising a pressure roller extending parallel to the scanning cylinder and serving for pressing the original onto the scanning cylinder during a clamping process of the original, said pressure roller being fixed to two curved swinging arms articulatedly connected to said rear region of said housing and matching the shape of said housing.

2. The original-affixing device according to claim 1, wherein said arms at the sides of said original table have two handles.

3. The original-affixing device according to claim 1, including, at said rear side of said housing, two curved swinging arms matching the curvature of said housing, an exchangeable pressure roller fixed to upper ends of said swinging arms, said pressure roller being alternatively lowerable onto the surface of the cylinder and pivotable rearwardly out of the region of said trough, respectively, by said swinging arms.

4. The original-affixing device according to claim 1, wherein said pressure roller has a mounting support constructed so that said pressure roller is freewheelingly rotatable in a direction wherein the cylinder is rotated during clamping, and is blocked in the direction of rotation opposite thereto.

5. The original-affixing device according to claim 1, including an illuminated magnifier fixed above the scanning cylinder on the rear side of said housing, so that the region of the scanning cylinder wherein the original is to be affixed is thereby displayable in magnified form.

6. The original-affixing device according to claim 1, wherein said arms, at lower ends thereof, by which they are guidable in said housing, are provided with two guide pins spaced a distance from one another and guidable, respectively, in coulisses.

7. The original-affixing device according to claim 6, wherein said coulisses are arranged within said housing so that said original table is liftable and simultaneously displaceable in a direction to the scanning cylinder by an engagement of said pins in said coulisses, said coulisses having a course beginning in a lower part of said housing, extending obliquely upwardly in a direction to the cylinder and, via a dead center, falling again in a direction to the lower part of said housing.

8. The original-affixing device according to claim 7, wherein said arms have two handles at the sides of the original table, and said original table is displaceable within said coulisses manually via said handles, said original table being liftable and being pullable forwardly so as to assume a latched position wherein the scanning cylinder is respectively insertable into and removable from said trough, and, alternatively, said original table, due to being lifted and being pushed rearwardly, and overcoming the dead center of said coulisses and being lowered in the direction to the lower part of said housing, assuming a position within said coulisses wherein said original table rests on the respective scanning cylinder.

9. The original-affixing device according to claim 1, wherein the two cylinders are a cylinder of smaller diameter and a cylinder of larger diameter, the device including, within and at the ends of said trough, two roller pairs for the cylinder of smaller diameter, and two roller pairs for the cylinder of larger diameter, the respective cylinders resting on said roller pairs, respectively.

10. The original-affixing device according to claim 9, wherein the larger-diameter cylinder is shorter than the smaller-diameter cylinder.

11. The original-affixing device according to claim 9, wherein said roller pairs for the cylinder of larger diameter are arranged at the ends of said trough underneath said roller pairs for the cylinder of smaller diameter, mounting supports for said roller pairs for the cylinder of larger diameter at the two opposite ends of the trough being spaced a smaller distance from one another, corresponding to the length of the larger cylinder.

12. The original-affixing device according to claim 9, wherein the larger-diameter cylinder has a length which corresponds to the length of the smaller-diameter cylinder.

13. The original-affixing device according to claim 9, wherein the larger-diameter cylinder has a length which is greater than the length of the smaller-diameter cylinder.

14. The original-affixing device according to claim 9, wherein the larger-diameter cylinder has a length at least equal to the length of the smaller-diameter cylinder, and including an annular recess formed at that end of said trough at which the open end of the larger-diameter cylinder is located, the open end of the larger-diameter cylinder being able to be pushed into said annular recess, said annular recess being of such width that the open end of the larger-diameter cylinder is movable freely within said annular recess.

* * * * *